United States Patent
Soetarman

(10) Patent No.: US 8,504,582 B2
(45) Date of Patent: Aug. 6, 2013

(54) SYSTEM AND METHODS FOR UNIT OF MEASUREMENT CONVERSION AND SEARCH QUERY EXPANSION

(75) Inventor: Benny Soetarman, Fremont, CA (US)

(73) Assignee: eBay, Inc., San Jose, CA (US)

( * ) Notice: Subject to any disclaimer, the term of this patent is extended or adjusted under 35 U.S.C. 154(b) by 597 days.

(21) Appl. No.: 12/347,651

(22) Filed: Dec. 31, 2008

(65) Prior Publication Data

US 2010/0169353 A1 Jul. 1, 2010

(51) Int. Cl.
  *G06F 17/30* (2006.01)
(52) U.S. Cl.
  USPC ............... 707/760; 707/765; 707/768
(58) Field of Classification Search
  None
  See application file for complete search history.

(56) References Cited

U.S. PATENT DOCUMENTS

| | | | |
|---|---|---|---|
| 6,349,276 B1 * | 2/2002 | McCarley ................. | 704/8 |
| 6,374,252 B1 * | 4/2002 | Althoff et al. ............ | 1/1 |
| 6,480,843 B2 * | 11/2002 | Li ........................... | 1/1 |
| 6,523,028 B1 | 2/2003 | DiDomizio et al. | |
| 6,941,293 B1 | 9/2005 | Dean et al. | |
| 7,171,418 B2 | 1/2007 | Blessin | |
| 8,326,856 B2 * | 12/2012 | Zhang et al. ............. | 707/760 |
| 2002/0073115 A1 * | 6/2002 | Davis ....................... | 707/500.1 |
| 2002/0091690 A1 | 7/2002 | Bailey et al. | |
| 2002/0184206 A1 * | 12/2002 | Evans ....................... | 707/4 |
| 2003/0126117 A1 * | 7/2003 | Megiddo et al. .......... | 707/3 |
| 2003/0212527 A1 * | 11/2003 | Moore et al. ............. | 702/179 |
| 2003/0220917 A1 * | 11/2003 | Copperman et al. ..... | 707/3 |
| 2004/0193420 A1 * | 9/2004 | Kennewick et al. ..... | 704/257 |
| 2004/0236736 A1 | 11/2004 | Whitman et al. | |
| 2005/0149499 A1 * | 7/2005 | Franz et al. .............. | 707/3 |
| 2005/0234888 A1 | 10/2005 | Bailey et al. | |
| 2006/0111893 A1 * | 5/2006 | Florian et al. ............ | 704/8 |
| 2006/0265391 A1 | 11/2006 | Posner et al. | |
| 2006/0271353 A1 | 11/2006 | Berkan et al. | |
| 2007/0027865 A1 | 2/2007 | Bartz et al. | |
| 2007/0050332 A1 | 3/2007 | Grenzberg et al. | |
| 2007/0088723 A1 * | 4/2007 | Fish ......................... | 707/100 |
| 2007/0100804 A1 | 5/2007 | Cava | |
| 2007/0150259 A1 | 6/2007 | Akahane et al. | |
| 2007/0168344 A1 | 7/2007 | Brinson et al. | |
| 2007/0203929 A1 | 8/2007 | Bolivar | |
| 2008/0114751 A1 * | 5/2008 | Cramer et al. ........... | 707/5 |

OTHER PUBLICATIONS

"Implicit User Modeling for Personalized Search," by Shen et al. In: Proc. of the 14th ACM Intl Conf. on Info. and Knowledge Mgt., pp. 824-831 (2005). Available at: ACM.*

(Continued)

*Primary Examiner* — Neveen Abel Jalil
*Assistant Examiner* — Daniel Kinsaul
(74) *Attorney, Agent, or Firm* — Haynes and Boone, LLP

(57) ABSTRACT

A system and methods for unit of measurement conversion and search query expansion are described. The search query expansion may include identifying an initial unit of measurement associated with a property and an initial numeric value for the initial unit of measurement within a search query, automatically forming an expanded search query by expanding the search query to include at least one related unit of measurement associated with the property, and sending the expanded search query to a search engine to search a database. Other embodiments are described and claimed.

18 Claims, 3 Drawing Sheets

300

IDENTIFY AN INITIAL UNIT OF MEASUREMENT ASSOCIATED WITH A PROPERTY AND AN INITIAL NUMERIC VALUE FOR THE INITIAL UNIT OF MEASUREMENT WITHIN A SEARCH QUERY
310

AUTOMATICALLY FORM AN EXPANDED SEARCH QUERY BY EXPANDING THE SEARCH QUERY TO INCLUDE AT LEAST ONE RELATED UNIT OF MEASUREMENT ASSOCIATED WITH THE PROPERTY
320

SEND THE EXPANDED SEARCH QUERY TO A SEARCH ENGINE TO SEARCH A DATABASE
330

OTHER PUBLICATIONS

"Query Expansion and Machine Translation for Robust Cross-Lingual Information Retrieval," by Lao et al. In: Proc. of NTCIR-7 (Dec. 16-19, 2008). Available at: http://www.cs.cmu.edu/afs/cs/Web/People/nlao/publication/2009/2009-NTCIR7-IR4QA-LaoN.pdf.*

"An Intelligent Multilingual Information Browsing and Retrieval System Using Information Extraction," by Aone et al. In: Proc. 5th Conf. on Applied Natural Language Processing (1997). Available at: ACM.*

* cited by examiner

SYSTEM AND METHODS FOR UNIT OF MEASUREMENT CONVERSION AND SEARCH QUERY EXPANSION

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective platform for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. For these reasons, sellers actively use the Internet to offer, sell, and distribute a wide variety of goods to take advantage of the many benefits provided by the Internet and electronic commerce.

One example of a market for goods within the realm of electronic commerce is the online marketplace hosted by eBay® Corporation, San Jose, Calif. The eBay® online marketplace is implemented by a network-based system that provides a web-based platform for enabling sellers to list and display items for sale and buyers to bid on and/or purchase the items that are offered. The eBay® online marketplace provides secure transactions between buyers and sellers, online auctions for facilitating transactions at fair market value, and the ability to leave feedback for improving buyer and seller accountability.

To allow a prospective buyer to view details of goods currently being offered for sale, the eBay® online marketplace provides a search interface for allowing a user to submit a query to a search engine and, in response, view search results displayed as a list of goods that satisfy the search criteria specified in the query. In some cases, the search criteria provided by the user may be so specific or narrow that the limited search results provided in response to the query exclude goods which would be of interest to a prospective buyer.

SUMMARY

Various embodiments relate to a system and methods for unit of measurement conversion and search query expansion. The search query expansion may include identifying an initial unit of measurement associated with a property and an initial numeric value for the initial unit of measurement within a search query, automatically forming an expanded search query by expanding the search query to include at least one related unit of measurement associated with the property, and sending the expanded search query to a search engine to search a database. Other embodiments are described and claimed.

BRIEF DESCRIPTION OF THE DRAWINGS

The foregoing aspects and many of the attendant advantages of various embodiments will become more readily appreciated and better understood by reference to the following detailed description and the accompanying drawings.

DETAILED DESCRIPTION

Various embodiments are described for unit of measurement conversion and search query expansion. Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
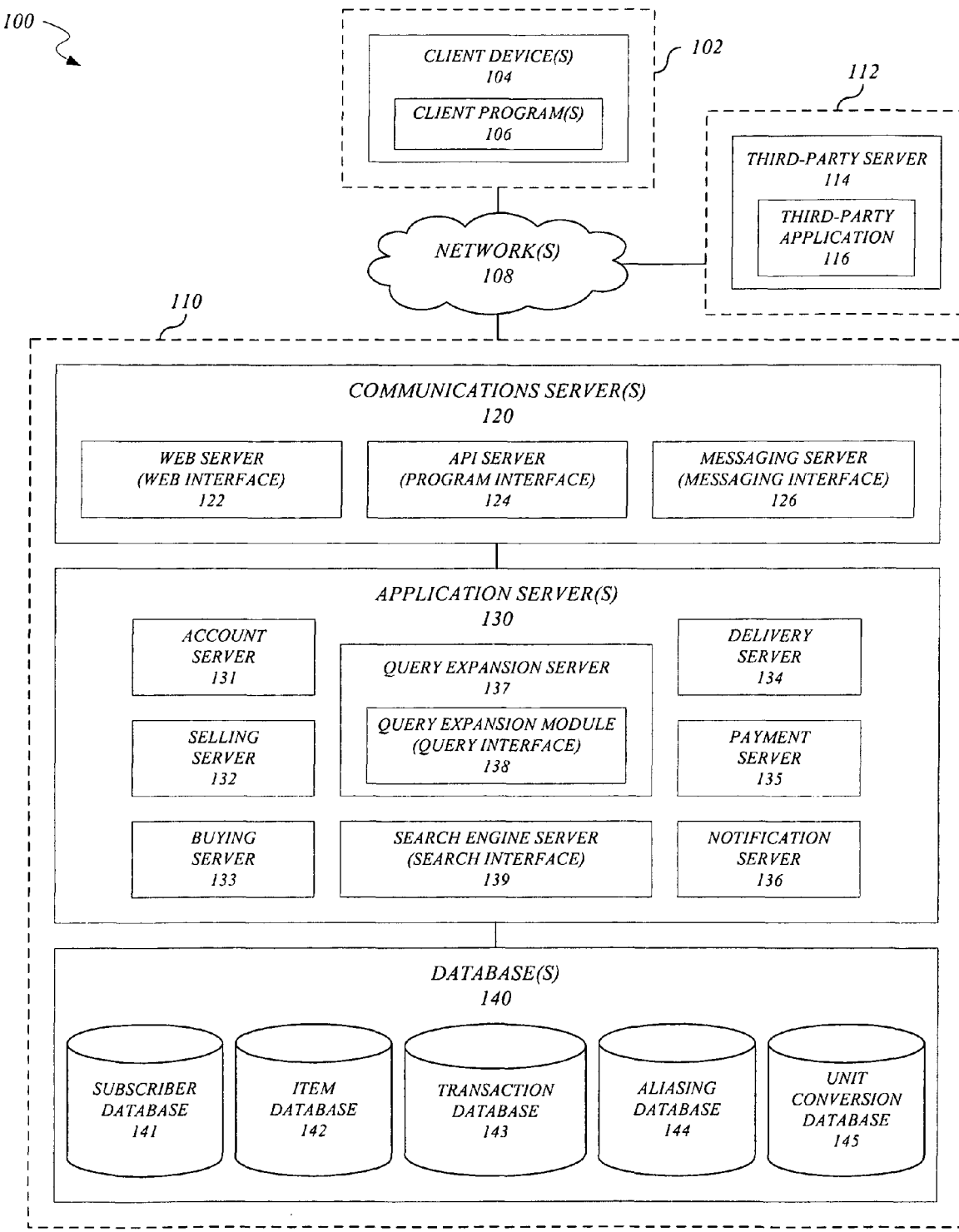
FIG. 1 illustrates an exemplary communications system for providing an online marketplace in accordance with various embodiments.

FIG. 1 illustrates a communications system 100 suitable for implementing various embodiments. The elements of the communications system 100 generally may comprise physical or logical entities for communicating information and, in some cases, may be implemented as hardware, software, or combination thereof, as desired for a given set of design parameters or performance constraints. Although FIG. 1 includes a limited number of elements for purposes of illustration, it can be appreciated that the communications system 100 may include more or less elements as well as other types of elements.

Various elements of the communications system 100 may be implemented utilizing one or more computing devices having computing and/or communications capabilities in accordance with the described embodiments. Exemplary computing devices may include, without limitation, a mobile device, a personal digital assistant (PDA), a mobile computing device, a communications device, a telephone, a mobile telephone, a cellular telephone, a smart phone, a handset, a one-way pager, a two-way pager, a messaging device, a computer, a personal computer (PC), a desktop computer, a work station, a laptop computer, a notebook computer, a tablet computer, a handheld computer, a mini-computer, a network appliance, a web appliance, a server, a server computer, a server array, a server farm, an Internet server, a web server, a network server, a main frame computer, a supercomputer, a distributed computing system, multiprocessor system, processor-based systems, a control system, consumer electronic equipment, a media device, a gaming device, a television, a digital television, a set-top box (STB), wireless access point, base station, subscriber station, mobile subscriber center, radio network controller, a network access device, a telephone network device, a mobile telephone network device, a VoIP network device, a radio network device, a television network device, a satellite network device, a router, a hub, a gateway, a bridge, a switch, a machine, or combination thereof.

The computing devices utilized by the communications system 100 may be implemented by various hardware and/or software components in accordance with the described embodiments. Exemplary hardware components may include processing devices such as central processing unit (CPU) and/or other processors, microprocessors, application processors, radio processors, baseband processors, digital signal processors (DSP), circuits, circuit elements (e.g., transistors, resistors, capacitors, inductors, and so forth), integrated circuits, application specific integrated circuits (ASIC), programmable logic devices (PLD), a field programmable gate array (FPGA), logic gates, registers, semiconductor device, chips, microchips, chip sets, memory such as volatile and/or non-volatile memory, a display such as a liquid crystal display (LCD) or cathode ray tube (CRT), input devices such a keyboard, mouse, stylus, touch pad, and/or touch screen, networking devices such as ports, network interface cards (NICs), transmitters, receivers, transceivers, and/or antennas, as well as other components. Exemplary software components may include computer programs, applications, application programs, system programs, operating system (OS) software, middleware, firmware, a software interface, a programmatic interface, an application program interfaces (API), a network interface, a web interface, a messaging interface, modules, instruction sets, routines, subroutines, functions, calls, computing code, or combination thereof.

Various elements of the communications system 100 may support wired and/or wireless communications functionality in accordance with the described embodiments. For example, some computing devices may be arranged to communicate information over one or more types of communication links such as a wire, cable, bus, printed circuit board (PCB), backplane, switch fabric, semiconductor material, twisted-pair wire, co-axial cable, fiber optic connection, Ethernet connection, peer-to-peer (P2P) connection, a data channel, a radio channel, a satellite channel, a television channel, a broadcast channel, an infrared (IR) channel, a radio-frequency (RF) channel, a portion of the RF spectrum, one or more licensed or license-free frequency bands, and so forth.

Various elements of the communications system 100 may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/1xRTT, GSM/GPRS, EDGE, HSDPA, HSUPA, and others.

Computing devices and networks may support wireless local area network (WLAN) and/or wireless metropolitan are network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electromagnetic induction (EMI) communication, passive or active RFID communication, micro-impulse radar (MIR), ultra-wide band (UWB) communication, automatic identification and data capture (AIDC) communication, and others.

Further aspects and advantages of various embodiments will become more readily appreciated and better understood by the following description of the elements of the communications system 100 illustrated in FIG. 1. Although certain exemplary embodiments and implementations may be illustrated and described as comprising a particular combination of elements and performing a particular set of operations, it is to be understood that the principles and techniques discussed herein are not limited to such examples.

In the embodiment shown in FIG. 1, the communications system 100 includes, among other elements, a client 102 which may comprise or employ one or more client devices 104 such as a mobile computing device, a PC, and/or any other computing device having computing and/or communications capabilities in accordance with the described embodiments. The client devices 104 generally may provide one or more client programs 106 such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. In some usage scenarios, one or more of the client programs 106 may display various graphical user interfaces (GUIs) to present information to and/or receive information from one or more of the client devices 104.

As shown, the client 102 is communicatively coupled via one or more networks 108 to a network-based system 110. The network-based system 110 may be structured, arranged, and/or configured to allow the client 102 to establish one or more communications sessions with the network-based system 110 using various computing devices 104 and/or client programs 106. Accordingly, a communications session between the client 102 and the network-based system 110 may involve the unidirectional and/or bidirectional exchange of information and may occur over one or more types of networks 108 depending on the mode of communication. While the embodiment of FIG. 1 illustrates the communications system 100 deployed in a client-server operating environment, it is to be understood that other suitable operating environments and/or architectures may be used in accordance with the described embodiments.

Data and/or voice communications between the client 102 and the network-based system 110 may be sent and received over one or more networks 108 such as the Internet, a WAN, a WWAN, a WLAN, a mobile telephone network, a landline telephone network, a VoIP network, as well as other suitable networks. For example, the client 102 may communicate with the network-based system 110 over the Internet or other suitable WAN by sending and or receiving information via interaction with a web site, e-mail, IM session, and/or video messaging session. The client 102 also may communicate with the network-based system 110 via a telephone call to a customer service agent and/or interactive voice response (IVR) system made over a mobile telephone network, a landline network, and/or a VoIP network. In wireless implementations, the client 102 may communicate with the network-based system 110 over the Internet via a WLAN or mobile telephone network that supports WWAN communications services. The client 102 also may communicate over a mobile telephone network via SMS and/or MMS messaging. It is to be appreciated that the embodiments are not limited in this regard.

In various usage scenarios, communication sessions and/or messaging between the client 102 and the network-based system 110 may involve multiple modes of communication and/or multiple networks. In some cases, for example, the client 102 may initiate communication with the network-based system 110 by interacting with a web site. In response, the network-based system 110 may communicate with the client 102 in a variety of ways such as via the web site, e-mail, IM, SMS, MMS, and/or a telephone call from a customer service agent and/or IVR system. The communication from the network-based system 110 may comprise a message (e.g., e-mail, IM, SMS, MMS) containing relevant static or dynamic content, an embedded hyperlinked URL for directing the client 102 to a web site, and/or a hyperlinked telephone number for allowing the client 102 to click and place a telephone call to an agent (e.g., customer service agent and/or IVR system) of the network-based system 110.

When communicating with the network-based system 110, the client 102 may employ one or more client devices 104 and/or client programs 106. In various implementations, the client devices 104 and/or client programs 106 may host or provide one or more interfaces for communicating with the network-based system 110. Exemplary interfaces may include a web interface, an API interface, a messaging interface, and/or other suitable communication interface in accordance with the described embodiments. The client programs 106 for communicating with the network-based system 110 may comprise, for example, pre-installed, authored, downloaded, and/or web-based computer programs.

The client programs 106 provided by one or more of the client devices 104 (e.g., mobile computing device and/or PC) may include a web client. The web client may comprise, for example, a desktop and/or mobile (e.g., WAP) web browser (e.g., Internet Explorer®, Mozilla®, Firefox®, Safari®, Opera®, Netscape Navigator®, etc.) capable of rendering web pages (e.g., HTML documents) and supporting various browser-based web technologies and programming languages such as HTML, XHTML, CSS, Document Object Model (DOM), XML, XSLT, XMLHttpRequestObject, JavaScript, ECMAScript, Jscript, Ajax, Flash®, Silverlight™, Visual Basic® (VB), VB Scripting Edition (VBScript), PHP, ASP, Java®, Shockwave®, Python, Perl®, C#/.net, and/or others.

In some embodiments, the web client may comprise or be implemented as a web-based application, web-based interpreter, and/or virtual machine for requesting, receiving, presenting, and/or updating content hosted by the network-based system 110. In such embodiments, the web client may employ various programming languages (e.g., interpreted, compiled, scripting, virtual machine, etc.) and/or may comprise an API implementation in accordance with a software development kit (SDK) provided by the network-based system 110.

In various usage scenarios, the client 102 may use a web client to provide an interface (e.g., HTTP interface) for navigating to a web site associated with the network-based system 110 and for requesting and receiving web page data from the network-based system 110. For example, the client 102 may use the web client to navigate to a web site associated with the network-based system 110 by entering a URL into a web browser address bar and/or by clicking on a hyperlinked URL delivered to the client 102 via a web page, web-based application, e-mail, IM, SMS, MMS, and/or other delivery mechanism.

In one or more embodiments, the web client may comprise or be implemented as a web browser toolbar for communicating with the network-based system 110. In such embodiments, the web browser toolbar may include, for example, a button (e.g., dedicated, customized, add-on) and/or a hyperlinked URL for navigating to a web site associated with the network-based system 110. The web browser toolbar also may implement enhanced features such as a search engine interface (e.g., text entry box, input fields, checkboxes, clickable hyperlinks) and/or one or more pull-down menus for accessing the network-based system 110, sending information (e.g., search query, keywords, user preferences, menu selections) to the network-based system 110, and/or receiving information (e.g., search results, relevant static or dynamic content) from the network-based system 110.

In one or more embodiments, the web client may comprise or be implemented as a widget such as a desktop or mobile widget for communicating with the network-based system 110. In such embodiments, the desktop or mobile widget may comprise web-based code, an interpreter, a virtual machine, and/or an API implementation to request, receive, present, and/or update content hosted by the network-based system 110. The desktop or mobile widget may comprise, for example, a client-side web application displayed on the desktop or phone-top of one or more of the client devices 104 implemented using various web technologies and programming languages. In various implementations, the desktop or mobile widget may be supported by a host runtime environment such as a web browser or suitable rendering engine and/or may be installed and run as a stand-alone application outside of a web browser.

As shown in FIG. 1, the communications system 100 includes, among other elements, a third party 112 which may comprise or employ a third-party server 114 hosting a third-party application 116. In various implementations, the third-party server 114 and/or third-party application 116 may host a web site associated with or employed by a third party 112 such as an affiliate, partner, or other third-party entity or user in accordance with the described embodiments. It can be appreciated that, in some implementations, the third party 112 may provide the third-party application 116 for promoting, enhancing, complementing, supplementing, and/or substituting for one more services provided by the network-based system 110. For example, the third-party server 114 and/or third-party application 116 may enable the network-based system 110 to provide the client 102 with additional services and/or information.

In some usage scenarios, one or more of the client programs 106 may be used to access the network-based system 110 via the third party 112. For example, the client 102 may use a web client to access and/or receive content from the network-based system 110 after initially communicating with a third-party web site. The web site of the third party 112 (e.g., affiliate, partner) may comprise, for example, a hyperlinked advertisement, a web widget, and/or an API implementation comprising web-based code within a web page to present static or dynamic content hosted by the network-based system 110 and/or to provide programmatic access to the network-based system 110.

It can be appreciated that the hyperlinked advertisement, web widget, and/or API implementation for communicating with the network-based system 110 may be hosted by various third-party web sites such as an affiliate web site, a partner web site, an online marketplace web site, an entertainment web site, a sports web site, a media web site, a search engine web site, a social networking web site, a blog, and/or any other corporate or personal web site or web page in accordance with the described embodiments. In some cases, the third party 112 may be directly or indirectly compensated for directing traffic from the third-party web site to the web site of the network-based system 110 and/or in the event that an electronic commerce transaction results after a user is directed from the third-party web sites to the web site of the network-based system 110.

The client programs 106 executed by one or more of the client devices 104 may include a programmatic client for accessing and communicating with the network-based system 110. Along with performing a certain set of functions, the programmatic client may include, for example, an implementation of an API provided by the network-based system 110 for enabling access to and/or communication with various elements (e.g., servers, databases) of the network-based system 110. In various embodiments, the API implementation may comprise executable code in accordance with an SDK provided by the network-based system 110. In some usage scenarios, the programmatic client may be implemented as a stand-alone or web-based database, point-of-sale (POS), and/or inventory management application for managing inventory and communicating with the network-based system 110.

The client programs 106 executed by one or more of the client devices 104 (e.g., mobile computing device and/or PC) also may include a messaging client. The messaging client may comprise, for example, an application that supports one or more modes of communication such as e-mail, IM, SMS, MMS, telephone, VoIP, video messaging, and so forth. It can be appreciated that some messaging clients may required and/or launch an Internet connection in the background when executed.

In accordance with various embodiments, the network-based system 110 may communicate with and provide services to users such as buyers and/or sellers of goods. For example, the network-based system 110 may comprise or implement an online marketplace for buyers and sellers of goods. It is to be appreciated that users other than buyers and/or sellers may communicate with the network-based system 110. In some cases, for example, the client 102 may be associated with an administrator or customer service agent and may communicate with the network-based system 110 to monitor, update, and/or otherwise manage one or more computing devices and/or services of the network-based system 110.

FIG. 1 illustrates an exemplary embodiment of the network-based system 110 for providing an online marketplace. As shown, the network-based system 110 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers.

In various implementations, the servers of the network-based system 110 may comprise or implement software components deployed in a tiered environment, where one or more servers are used to host server software running in each tier. For example, using a three-tiered architecture, one or more server software components may be hosted by front-end servers, one more server software components may be hosted by a middle tier or middleware implemented by application servers, and one more server software components may be hosted by a back-end tier implemented by databases and/or file systems. In some embodiments, servers of the network-based system 110 may be communicatively coupled with each other via a local area network (LAN) and/or suitable intranet or back-end network.

The network-based system 110 may comprise one or more communications servers 120 for providing suitable interfaces to enable communication using various modes of communication and/or via one or more networks 108. In the embodiment of FIG. 1, the communications servers 120 include a web server 122, an API server 124, and a messaging server 126 to provide interfaces to one or more application servers 130. In various usage scenarios, the client 102 may communicate with the applications servers 130 of the network-based system 110 via one or more of a web interface provided by the web server 122, a programmatic interface provided by the API server 124, and a messaging interface provided by the messaging server 126. It can be appreciated that the web server 122, the API server 124, and the messaging server 126 may be structured, arranged, and/or configured to communicate with various types of client devices 104 and/or client programs 106 and may interoperate with each other in some implementations.

The web server 122 may provide a web interface to enable access by the client 102 and/or the third party 112 to the various services and functions provided by the application servers 130. For example, the web server 122 may be arranged to receive data from the client 102 and/or third party 112 and to pass the data to one or more application servers 130 within the network-based system 110. The web server 122 may be arranged to host web pages (e.g., HTML documents) and provide an appropriate web interface (e.g., HTTP, CGI, etc.) for enabling data to be presented to and received from entities via the Internet. The web server 122 may communicate with web clients and/or applications such as a web browser, web browser toolbar, desktop widget, mobile widget, web-based application, web-based interpreter, virtual machine, and so forth.

The API server 124 may provide a programmatic interface to enable access by the client 102 and/or the third party 112 to the various services and functions provided by the application servers 130. The API server 124 may be arranged to communicate with various client programs 106 and/or a third-party application 116 (e.g., third-party web site) comprising an API implementation for the network-based system 110.

The messaging server 126 may provide a messaging interface to enable access by the client 102 and/or the third party 112 to the various services and functions provided by the application servers 130. The messaging server 126 may be arranged to communicate with various messaging clients and/or applications such as e-mail, IM, SMS, MMS, telephone, VoIP, video messaging, and so forth.

In various embodiments, the application servers 130 of the network-based system 110 may be structured, arranged, and/or configured to provide various online marketplace services to users that access the network-based system 110. The application servers 130, in turn, may be coupled to and capable of accessing one or more databases 140. The databases 140 generally may store and maintain various types of information for use by the application servers 130 and may comprise or be implemented by various types of computer storage devices (e.g., servers, memory) and/or database structures (e.g., relational, object-oriented, hierarchical, dimensional, network) in accordance with the described embodiments.

When implemented as an online marketplace for goods, the application servers 130 of the network-based system 110 may provide various online marketplace services including, for example, account services, buying services, selling services, delivery services, payment services, notification services, search query expansion services, and other services in accordance with the described embodiments.

Account Services

In the exemplary embodiment shown in FIG. 1, the application servers 130 may comprise an account server 131 configured to allow a user to establish and/or manage a subscriber account with the network-based system 110. To create a subscriber account, a user may provide the network-based system 110 with account information such as a unique username, e-mail address, password, name, location (e.g., address, city, country, and/or zip code), telephone numbers (e.g., home, work, and/or mobile), and/or other required information for identifying and/or authenticating the user. After receiving the required account information and instructions from the user to create the subscriber account, the network-based system 110 may create the subscriber account and store the account information in a subscriber database 141.

To effectuate the buying or selling of goods, the user may be required to link the subscriber account of to a source of funds and/or financial value for completing different transactions via the network-based system 110. It can be appreciated that the user may provide various types of entities or third-party financial accounts capable of supplying or receiving funds and/or financial value in accordance with the described embodiments. Exemplary third-party financial accounts may include, without limitation, a bank account, credit card account, and/or a third-party payment services account. Online purchases may be made, for example, using a third-party payment service, such as PayPal®, Mountain View, Calif. In such cases, payment may be made electronically by credit card or by debiting the payment services account of the buyer and then crediting the payment services account of the seller.

Additionally or alternatively to linking the subscriber account to a source of financial value based on a commercial currency (e.g., U.S. dollar), a user may link to the subscriber account to a source of financial value based on a proprietary and/or promotional currency (e.g., points, rewards, coupons) capable of accumulation and/or redemption by the user to pay for goods or services. It can be appreciated that multiple sources of funds and/or financial value associated with the user may be linked to the subscriber account enabling the user to select among such sources to effectuate different payment transactions via the network-based system 110.

When accessing the subscriber account, the user may view and/or manage various details of past and pending transactions. For example, the subscriber account may provide a seller with details regarding past and pending sale listings (e.g., shipped, canceled, inactive, expired, deleted, active, pending confirmation, awaiting shipment) and may allow the user to track listings, modify the prices of listings, view and confirm received orders, view and confirm orders to ship, view shipped orders, view canceled orders, view the status of payments and edit payment options, view past payments, and so forth. The subscriber account also may provide a buyer with details regarding past and pending purchase transactions (e.g., past orders, purchased, delivered, canceled, expired, order status, delivery status, active bids, auctions lost) and may allow the user to view order history, track active bids, modify offers, view and edit payment options, and so forth.

In various implementations, the user may customize a subscriber account with one or more interests and preferences. For example, the user may add and edit information associated with the subscriber account regarding one or more activities or type of goods of interest to the user. The user also may customize a subscriber account with one or more notification preferences. In some cases, the user may request to receive promotional notifications featuring particular goods that may be interest to the user. The user also may subscribe to receive customized alert notifications in a variety of ways such as via e-mail, IM, SMS, MMS, and/or other suitable delivery mechanism. The user may access the subscriber account to subscribe to receive notifications, view recent notifications, add or change notifications, and/or discontinue notifications.

Selling Services

In the exemplary embodiment shown in FIG. 1, the application servers 130 may comprise a selling server 132 configured to allow a user to offer goods for sale via an online marketplace provided by the network-based system 110. To list goods for sale, a seller may provide the network-based system 110 with required information such as quantity, size, type, color, brand, model, price, payment method, and so forth. After receiving the required item information and instructions from the seller to publish an item listing, the network-based system 110 may create an item description and store the item description in the item database 142 for publication to users of the network-based system 110. It can be appreciated that upon the sale of the goods, one or more delivery options may be available to both the buyer and the seller.

Buying Services

In the exemplary embodiment shown in FIG. 1, the application servers 130 may comprise a buying server 133 configured to allow a user to locate goods offered for sale via an online marketplace provided by the network-based system 110. To find one or more goods, a buyer may access the network-based system 110 and view the goods for sale published by the network-based system 110 from the item database 142. The buyer may click and follow links for various categories and subcategories of goods presented within a web page. The buyer may search for goods using a search engine interface by entering a search query into a search engine text entry box and viewing results comprising goods that satisfy the search query. The buyer also may be presented with an item finder screen comprising a plurality of pull-down menus for allowing the buyer to formulate a search by selecting item properties from the pull-down menus. In various embodiments, a search query of the buyer may be automatically expanded to broaden the search for goods published by the network-based system 110. Further descriptions of such embodiments are provided in greater detail below.

After locating a desired item, the buyer may place an order for the item via the network-based system by providing a delivery location, selecting a method of payment (e.g., credit card, PayPal® account), confirming details of the transaction, and completing the purchase. When the buyer places the order, a confirmation e-mail is sent to the buyer, and the seller is notified of the order request via e-mail and requested to confirm the availability and delivery of the item. Upon receiving confirmation from the seller that the item has been sent, the buyer is notified as to when delivery can be expected. It can be appreciated that upon the sale of the item, one or more delivery options may be available depending on the locations of the buyer and the seller.

Delivery Services

In the exemplary embodiment shown in FIG. 1, the application servers 130 may comprise a delivery server 134 configured to arrange the delivery of goods from the seller to the buyer. In various implementations, the network-based system 110 may coordinate the delivery of goods from the seller to the buyer. For example, when the buyer places an order, the network-based system 110 may determine and present shipping options to the buyer. The buyer may provide a delivery or pick-up location, and the network-based system 110 may determine available shipping methods and the associated cost of each shipping method. Upon confirmation by the seller that the goods have been sent, the network-based system 110 may communicate delivery tracking information to the buyer and/or seller. The network-based system 110 also may notify the buyer of the delivery location and expected time and date of delivery.

Payment Services

In the exemplary embodiment shown in FIG. 1, the application servers 130 may comprise a payment server 135 configured to effectuate and/or manage payments between buyers and sellers and to post and track financial transactions for users of the network-based system 110. In various implementations, the payment server 135 may account for a transfer of funds and/or financial value by debiting the a source of funds and/or financial value linked to the subscriber account of the buyer and crediting a source of funds and/or financial value linked to the subscriber account of the seller. For example, the network-based system 110 may securely communicate with one or more financial institutions such as a bank or credit card company over one or more networks 108 and arrange the transfer of funds and/or financial value from the buyer to the seller. Transaction information for past and pending transactions may be stored by the network-based system 110 in a transaction database 143.

The payment server 135 also may provide dispute resolution mechanisms to handle payment disputes arising between transacting parties and/or fraud prevention mechanisms to prevent fraudulent transaction, unauthorized use of financial instruments, non-delivery of goods, abuse of personal information, and so forth. Although the payment server 135 is shown in FIG. 1 as forming part of the networked-based system 110, it can be appreciated that the payment server 135 may form part of an online third-party payment service that is separate and distinct from the network-based system 110 in other embodiments.

Notification Services

In the exemplary embodiment shown in FIG. 1, the application servers 130 may comprise a notification server 136 configured to generate and send various types of notifications to users of the network-based system 110. The notification server 146 may communicate with users over one or more types of networks 108 via interfaces provided the communications servers 120. It can be appreciated that, in some implementations, notifications may be forwarded to users via an intermediary such as an Internet Service Provider (ISP), online service provider (OSP), web-based e-mail service provider, message aggregator (e.g., SMS aggregator), mobile transaction network entity, and so forth.

The notifications may comprise promotional messages and/or information related to online marketplace transactions. For example, notifications may be sent to sellers for indicating the status of goods for sale, informing the seller of offers (e.g., auction bids), allowing the user to modify listed prices, notifying the seller of orders, requesting confirmation of the availability of the goods, providing delivery instructions, requesting confirmation of delivery, tracking shipped orders, providing the status of payments, soliciting feedback, and so forth. Notifications may be sent to buyers for tracking purchase transactions (e.g., active bids, auctions lost), allowing the buyer to modify offers, confirming an order, providing the status of payments, tracking shipped orders, requesting confirmation of receipt, soliciting feedback, and so forth.

Search Query Expansion

In the exemplary embodiment shown in FIG. 1, the application servers 130 may comprise a query expansion server 137 configured to receive a search query and automatically form an expanded search query. The query expansion server 137 may communicate with and receive a search query from one or more client devices 104 and/or a third party server 114 via one or more of the communications servers 120. In some usage scenarios, for example, a user may communicate a search query using a web client (e.g., web browser, web browser toolbar, and/or a desktop or mobile widget) to the query expansion server 137 via the web server 122.

In the embodiment of FIG. 1, the query expansion server 137 comprises a query expansion module 138 for providing a query interface to receive a search query and for performing various computer-implemented methods and/or operations in accordance with the described embodiments. The query expansion module 138 may be implemented by a computing device, such as the query expansion server 137, as a computer-executable program module comprising executable computer program instructions stored on a computer-readable storage medium. When executed by the computing device, the stored executable computer program instructions may cause the computing device to perform one or more computer-implemented methods and/or operations in accordance with the described embodiments. Additionally or alternatively, various computer-implemented methods and/or operations may be performed by hardware or other digital logic.

When forming an expanded search query, the query expansion server 137 may access an aliasing database 144 and/or a unit conversion database 145 as described in greater detail below. After generating the expanded search query, the query expansion server 137 may send the expanded search query to a search engine server 139 to search one or more databases, such as item database 142.

In some implementations, the search query expansion may be performed as part of or during search query operations. For example, the search query expansion may be performed after a search query is received and prior to submitting a search query to the search engine server 139 for searching the item database 142. Additionally or alternatively, one or more search query expansion operations may be performed separate from and off-line relative to the search query operations. In some cases, the search query expansion can be performed on previously submitted search queries. For example, search query expansion may be performed on a previously submitted query when a search result does not include at least a threshold number of items. The search query expansion also may be implemented by standalone software programs and/or computing devices which do not necessarily have networking capabilities.

As shown in FIG. 1, the query expansion server 137 comprises the query expansion module 138 for providing a query interface between a search interface provided by the search engine server 139 and one or more of the client devices 104 and the third-party server 114. It can be appreciated that while the query expansion module 138, the aliasing database 144, and the unit conversion database 145 may be implemented by the network-based system 110 as shown in FIG. 1, the embodiments are not limited in this regard. For example, the query expansion module 138, the aliasing database 144, and/or the unit conversion database 145 may be implemented by various types of computing devices separate and distinct from the network-based system 110 in other embodiments.

In some embodiments, the query expansion module 138 may be implemented by one or more of the client devices 104 and/or the third-party server 114. For example, the query expansion module 137 may be implemented on a PC or mobile device to extend the search functionality of a web client (e.g., desktop or mobile web browser, web browser toolbar, desktop or mobile widget, etc.), programmatic client, messaging client, and/or other application program. The query expansion module 138 also may be implemented by the third-party server 114 to extend the search functionality of the third-party application 116.

Furthermore, while the search query expansion may be performed when searching for goods listed by a network-based system 110 that provides online marketplace services, the embodiments are not limited to this context. For example, the search query expansion may be performed on other types of search queries, expanded search queries may be submitted to other types of search engines, and other types of databases may be searched in accordance with the described embodiments.

The following provides a description of computer-implemented search query expansion methods and/or operations in accordance with the described embodiments. It can be appreciated that such methods and/or operations may be performed by various types of computer devices and systems such as a computing device or system implementing the query expansion module 138.

In various implementations, a search query is received and then automatically expanded to form an expanded search query which, in turn, is submitted to the search engine server 139 for searching the item database 142. The search query may include a string of text comprising alphanumeric characters and/or symbols representing one or more search terms. It can be appreciated that when the search query includes more than one search term, operations may be performed for one, some, or all of the search terms in the search query. Each search term may comprise one or more alphanumeric characters, sets of alphanumeric characters, symbols, combinations of alphanumeric characters and symbols, words, phrases, abbreviations, numeric values, numeric value ranges, and/or combinations thereof. In some cases, search terms of a search query may be separated by spaces, enclosed by quotation marks, joined by Boolean logical operators (e.g., AND, OR, etc.), associated with numeric qualifiers (e.g., >, <, =), and so forth.

In some embodiments, the search query may be broken down into units which may be recognized as search terms and/or may be logically combined into search terms. For example, the search query may be parsed using tokenization by segmenting the text string into semantically independent tokens. Each token may be defined in terms of its semantic value and may be a single-semantic-unit or a compound-semantic-unit. In some cases, the search query may be broken down into single-semantic units which may be recognized as tokens and/or may be logically combined into compound-semantic units which may recognized as tokens. The search query may include one or more tokens, which in turn, may represent one or more search terms. The search terms and/or tokens in a search query may be recognized in various ways such as by using reference-based approaches (e.g., dictionaries, databases), statistical-based approaches (e.g., probability distributions, proximity of words, frequency of terms, analysis of common search queries), and/or other suitable approaches in accordance with the described embodiments.

The search query may be evaluated to determine the presence of search terms and/or tokens which may be expanded. In various embodiments, evaluation of the search query involves determining whether the search query comprises an initial unit of measurement associated with a property and an initial numeric value for the initial unit of measurement. The determination may be made by analyzing the text string (e.g., alphanumeric characters and/or symbols), search terms, and/or tokens of a search query to identify the presence of an initial unit of measurement associated with a property and an initial numeric value for the initial unit of measurement.

The unit of measurement (UOM) in a search query may be any unit defined by a unit of measurement system. One example of a unit of measurement system is the International System of Units (SI) that defines standard metric units. Another example of a unit of measurement system is the United States Customary System that defines U.S. customary units which are also referred to as English units, Imperial units, or standard units. The unit of measurement in the search query may be expressed as a full name or contracted form (e.g., abbreviation, symbol) representing such units (e.g., metric units, U.S. customary units). The numeric value for the unit of measurement may be expressed as an integer, decimal numeral, fraction, and/or other type of number.

The unit of measurement may be associated with a property such as size, rate, time, cost, and so forth. The property associated with the unit of measurement may comprise, for example, a size such as length, width, thickness, height, distance, area, weight, mass, volume, area, data storage capacity, clothing size, or other dimension in accordance with the described embodiments. Exemplary units of measurement for size include, without limitation, kilometer (km), meter (m), centimeter (cm), millimeter (mm), mile (mi), yard (yd), feet (ft), inch (in), pound (lb), kilogram (kg), ounce (oz), ton (T, t), cubic meter ($m^3$), cubic centimeter (cc), gallon (gal), quart (qt), pint (pt), ounce (oz), hectare (ha), square meter ($m^2$), acre, square mile (sq mi), square feet ($ft^2$, sq ft), terabyte (TB), gigabyte (GB), megabyte (MB), kilobyte (KiB), and others.

The property associated with the unit of measurement may comprise a rate such as such as speed, velocity, acceleration, frequency, data transfer rate, fuel economy, energy efficiency, or other ratio in accordance with the described embodiments. Exemplary units of measurement for rate include, without limitation, kilometer per hour (km/h), meter per second (m/s), terahertz (THz), gigahertz (GHz), megahertz (MHz), Terabit per second (Tbit/s, Tbps), gigabit per second (Gb/s, Gbps), megabit per second (Mbits/s, Mbps), kilobit per second (kbit/s, kb/s, kbps), liters per 100 kilometers (L/100 km), kilometers per gallon (km/gal), kilometers per liter (kmpl), miles per gallon (mpg), and others.

The property may comprise time such as age or other time period, and the associated unit of measure may include year, month, day, hour (hr), minute (min), second (sec), and others. The property may comprise a cost such as price, value, or other ratio, and the associated unit of measurement may include, for example, currency such as U.S. dollar ($), euro ( € ), pound (£), yen (¥), and others. It can be appreciated that, in addition to the foregoing examples, other suitable properties and/or units defined by a unit of measurement system may be used in accordance with the described embodiments.

When the search query comprises a numeric value associated with a unit of measurement, the numeric value and unit of measurement generally will be in close proximity to each other. For example, in some cases, a unit of measurement may immediately follow a numeric value (e.g., 4 GB). In other cases, the numeric value and the unit of measurement may be separated by a single space (e.g., 3000 miles).

After identifying an initial unit of measurement associated with a property and an initial numeric value for the initial unit of measurement within the search query, automatic expansion of the search query may be performed to form an expanded search query. In some cases, the numeric value and the unit of measurement may comprise and/or may be identified from a single search term or token. In other cases, the numeric value and the unit of measurement may comprise and/or may be identified by separate search terms or tokens. Forming the expanded search query may comprise expanding the search query to include at least one related unit of measurement associated with the property. In various implementations, determining the related unit of measurement may involve performing aliasing and/or unit of measurement conversion, as described below.

In some embodiments, the related unit of measurement may comprise an alias of the initial unit of measurement. In such embodiments, the query expansion module 138 may direct the query expansion server 137 or other computing device to access the aliasing database 144. The aliasing database 144 may comprise, for example, one or more lookup tables, dictionaries, or other suitable data structure to determine and return an alias or equivalent for the initial unit of measurement. In some usage scenarios, a search query (e.g., 3 ft audio cable) may comprise an initial unit of measurement expressed as a standard or common abbreviation (e.g., ft). In such scenarios, aliasing of the initial unit of measurement may return a related unit of measurement comprising an alias (e.g., feet) of the abbreviation. The aliasing database 144 may be configured to return the full name or other lengthened form of an initial unit of measurement in response to receiving an abbreviation or other contracted form (e.g., symbol) as well as to return an abbreviation or other contracted form of an initial unit of measurement in response to receiving a full name or other lengthened form.

In some embodiments, aliasing may involve returning units of measurement translated into other languages (e.g., kilometer to kilometro or kilomètre) and/or returning alternate spellings for units of measurements (e.g., kilometer to kilometre). Aliasing also may involve returning more than one related unit of measurement including, for example, related units of measurement in more than one language (e.g., km to kilometer and kilometro) and/or including alternate spellings (e.g., km to kilometer and kilometre).

When aliasing is performed, forming the expanded search query may comprise associating and/or combining the related unit of measurement with the initial numeric value and/or appropriately formatting (e.g., positioning, spacing, etc.) the associated or combined related unit of measurement and initial numeric value for inclusion within the expanded search query. For example, the search query (3 ft audio cable) may comprise an initial numeric value (3) and an initial unit of measurement (ft). A related unit of measurement (feet) may be returned and associated with the initial numeric value, and an appropriately formatted combination (3 feet) may be generated for inclusion as one or more search terms or tokens within the expanded search query.

In addition to determining and returning an alias or equivalent for units of measurement, the aliasing database 144 also may be configured to determine and return an alias or equivalent for other search terms and/or tokens of the search query. In such embodiments, aliasing may involve returning search terms or tokens translated into one or more other languages and/or returning alternate spellings for search terms or tokens in conjunction with unit of measurement conversion as described below.

In various implementations, determining the related unit of measurement may involve performing unit of measurement conversion. In some embodiments, the related unit of measurement may comprise a different unit of measurement associated with the property of the initial unit of measurement. In such embodiments, the query expansion module 138 may direct the query expansion server 137 or other computing device to access the unit conversion database 145. The unit conversion database 145 may comprise, for example, one or more lookup tables, dictionaries, or other suitable data structure to determine and return a related unit of measurement associated with the property of the initial unit of measurement.

The unit conversion database 145 may be configured to return a different unit of measurement for the same property in response to receiving the initial unit of measurement, an alias of the initial unit of measurement, or an identifier associated with the initial unit of measurement. In some implementations, for example, the unit conversion database 145 may be indexed by units in a particular format such as by the full name of a unit of measurement. It can be appreciated that indexing by the full name of a unit may be advantageous since many units of measurement may be abbreviated in numerous ways. The embodiments, however, are not limited in this context, and the unit conversation database 145 also may be indexed by common abbreviations for units of measurement. In some embodiments, the unit conversion database 145 may be indexed by identifiers associated with units of measurement.

In some usage scenarios, the initial unit of measurement identified in the search query may be in the same format used by the unit conversion database 145 to index units. For example, when the unit conversion database 145 is indexed by the full names of units and the initial unit of measurement comprises the full name of a unit of measurement (e.g., kilometer), the unit conversion database 145 may return at least one related unit of measurement in response to the initial unit of measurement as presented in the search query.

However, when the unit conversion database 145 is indexed by full names of units and the initial unit of measurement comprises an abbreviation (e.g., km), an alias (e.g., kilometer) of the initial unit of measurement corresponding to the format used by the unit of conversion database 145 may be determined. The unit conversion database 145 then may return at least one related unit of measurement in response to the alias which, in this case, comprises the full name of the unit of measurement. It can be appreciated that aliasing from the full name of unit of measurement to an abbreviation may be required and/or performed if the unit of conversion database is indexed by abbreviations and the initial unit of measurement comprises the full name of a unit of measurement.

In some embodiments, the unit of conversion database 145 may be indexed by identifiers associated with units. For example, a single identifier may be mapped to the full name and/or all abbreviations for the unit. In such embodiments, an identifier associated with the initial unit of measurement may be determined, and the unit conversion database 145 may return at least one related unit of measurement in response to the identifier. In embodiments employing identifiers for units, the unit of conversion database 145 may be configured to return an identifier for the related unit of measurement which may be mapped to the full name and/or abbreviations for the related unit of measurement.

When unit conversion is performed, one or more related units of measurement may be determined. The one or more related units of measurement may comprise one or more different units of measurement associated with the property of the initial unit of measurement. Related units of measurements may comprise units defined by a unit of measurement system which is the same as and/or different from the unit of measurement system that defines the initial unit of measurement. In some embodiments, for example, the initial unit of measurement may comprise a U.S. customary unit defined by the United States Customary System, and the one or more related units of measurement may comprise one or more different U.S. customary units associated with the property of the initial unit of measurement. Alternatively or additionally, the initial unit of measurement may comprise a U.S. customary unit, and the one or more related units of measurement may comprise one or more different metric units defined by the International System of Units and associated with the property of the initial unit of measurement.

Unit conversion also may comprise mathematically converting the initial numeric value for the initial unit of measurement into a converted numeric value for the related unit of measurement. The mathematical conversion may be performed, for example, by the query expansion module 138 based on the one or more related units of measurement which are provided in response to initial units of measurement. The mathematical conversion may involve generating one or more converted numeric values for the related unit of measurement. For example, the query expansion module 138 may comprise logic for outputting a converted numeric value in response to an initial numeric value, an initial unit of measurement, and a related unit of measurement. In some implementations, the unit conversion database 145 may supply the query expansion module 138 with a conversion factor when returning a related unit of measurement. Each converted numeric value may be greater or less than the initial numeric value depending on the unit conversion and may be expressed as an integer, decimal numeral, fraction, and/or other type of number.

In some embodiments, the converted numeric value may comprise a mathematically rounded value. For example, the mathematical conversion may comprise calculating an exact value for the unit conversation and then mathematically rounding the exact value to generate the converted numeric value. Alternatively or additionally, the converted numeric value may comprise or form part of a numeric value range. For example, the mathematical conversion may comprise calculating an exact value and/or rounded value for unit conversion from the initial unit of measurement to the related unit of measurement and then determining a numeric value range comprising the exact value and/or rounded value to be used in the expanded search query. It can be appreciated that rounding the exact value and/or calculating a numeric value range may be advantageous since the exact value or rounded value may be so specific as to overly restrict the expanded search query.

Forming the expanded search query may comprise associating and/or combining each related unit of measurement with a corresponding converted numeric value and/or appropriately formatting (e.g., positioning, spacing, etc.) the associated or combined related unit of measurement and corresponding converted numeric value for inclusion within the expanded search query. In some cases, the converted numeric value and the corresponding related unit of measurement may comprise and/or may be generated as a single search term or token. In other cases, the converted numeric value and the corresponding related unit of measurement may comprise and/or may be identified by separate search terms or tokens.

In some cases, aliasing may be performed on the one or more related units of measurement. For example, when the initial unit of measurement submitted in a search query comprises an abbreviation for a unit and the related unit of measurement comprises the full name of a unit, aliasing may be employed to determine an abbreviation for the related unit of measurement for inclusion within the expanded search query. In such cases, an alias of a related unit of measurement may be associated and/or combined with a corresponding converted numeric value, and the combination may be appropriately formatted for inclusion within the expanded search query. The converted numeric value and the corresponding alias of the related unit of measurement may comprise and/or may be generated as a single search term or token or as separate search terms or tokens.

It can be appreciated that various combinations of aliasing and unit conversion may be performed in some embodiments. For example, when a search query (e.g., 3 ft audio cable) comprises an initial unit of measurement (e.g., ft) and an initial numeric value (e.g., 3), the related units of measurement may comprise an alias of the initial unit of measurement (e.g., feet), different units of measurement (e.g., yard, inch) defined by a common unit of measurement system (e.g., United States Customary System), aliases of such units (e.g., yd, in), converted numeric values for such units (e.g., 1, 36), different units of measurement (e.g., meter, centimeter) defined by a different unit of measurement system (e.g., International System of Units), aliases of such units (e.g., m, cm), and converted numeric values for such units (e.g., 0.9144, 91.44) which may be rounded (e.g., 1, 100) and/or included in numeric value range (e.g., 0.5-1.50, 50-150).

The related units of measurement which are provided in response to initial units of measurement may be predetermined or predefined from the perspective of users submitting search queries. That is, when a user submits a search query comprising an initial unit of measurement, one or more related units of measurement are determined and/or mathematical conversions are performed automatically without the user needing to specify any parameters for performing unit of measurement conversion. The related units of measurement and/or mathematical conversions may be provided according to the parameters of the query expansion module 138 specified in advance by the network-based system 110. In various embodiments, the parameters of the query expansion module 138 may be periodically updated by the network-based system 110 to modify and/or optimize the related units of measurement and mathematical conversions which are provided in response to initial units of measurement. The related units of measurement and mathematical conversions which are provided may be updated, for example, based on popularity and/or success of search queries. Accordingly, in such embodiments, the related units of measurement and/or mathematical conversions which are provided in response to initial units of measurement may be dynamic from the perspective of users submitting search queries.

In some implementations, the user may be notified that search expansion will be or has been performed so that the process is not completely transparent to the user. For example, in some cases, a search results page may include a notification that the search result is an expanded listing. In other cases, the user may be allowed to set preferences for search query expansion. The user also may be presented with an opportunity to review an expanded search query and prompted to submit the expanded search query after review.

To further expand the search query, in some embodiments, at least one other search term within the search query other than the initial unit of measurement and the initial numeric value for the initial unit of measurement may be identified. After identifying the at least one other search term, an alias of the at least one other search term may be determined. Determining the alias of the at least one other search term may involve, for example, translating the at least one other search term into one or more other languages. Such languages may include, without limitation, English (e.g., US English, UK English, CA English), French (e.g., FR French, CA French), Spanish (e.g., ES Spanish, MX Spanish), German, Italian, Japanese, Chinese, Hindi, Arabic, Portuguese, Russian, and so forth. In various implementations, language translation of the at least one other search term may be performed in conjunction with performing unit conversion between different unit of measurement systems. For example, when unit of conversion involves a different unit of measurement system used by different countries, one or more search terms describing an item (e.g., red convertible sports car) may be translated into one or more languages of countries that use the different unit of measurement system.

The expanded search query may be formed by including at least one related unit of measurement to the search query. The expanded search query also may include a converted numeric value, a numeric value range, an alias of a related unit of measurement, and/or an alias of at least one other search term other than the initial unit of measurement and the initial numeric value in accordance with the described embodiments. One or more related units of measurement, converted numeric values, numeric value ranges, and/or aliases may be added to the search query, for example, as one or more additional alphanumeric characters and/or symbols, search terms, and/or tokens to be included along with the original alphanumeric characters and/or symbols, search terms, and/or tokens of the search query.

In various implementations, the expanded search query may be sent to a search engine (e.g., search engine server 139) to search a database (e.g., item database 142). The search engine may search the database and retrieve items from the database that satisfy the expanded search query. The search engine may aggregate the items that satisfy the expanded search query into a search result. The search result may be received by one or more client programs (e.g., client programs 106) and/or one or more client devices (e.g., client device 104) to display within a user interface presented to a user. In some embodiments, the search result may be presented within a user interface as a list of available goods for sale that satisfy an expanded search query. The embodiments, however, are not limited to this context.

As described above, the network-based system 110 may communicate with users over one or more types of networks 108 via interfaces provided the communications servers 120 and provide various services to users such as online marketplace services via the application servers 130 and databases 150. When servicing a user, the network-based system 110 may present information to and/or receive information from the user in a variety of ways such by displaying and receiving information via user interfaces (e.g., web pages, interactive screens), sending and receiving messages (e.g., e-mail, IM, SMS, MMS, video message), placing and/or receiving telephone calls (e.g., landline, mobile, VoIP, IVR calls), and so forth. User interfaces also may be displayed to a user via one or more client programs 106 such as a web client (e.g., web browser, desktop or mobile widget, web browser toolbar).

Figure 2:
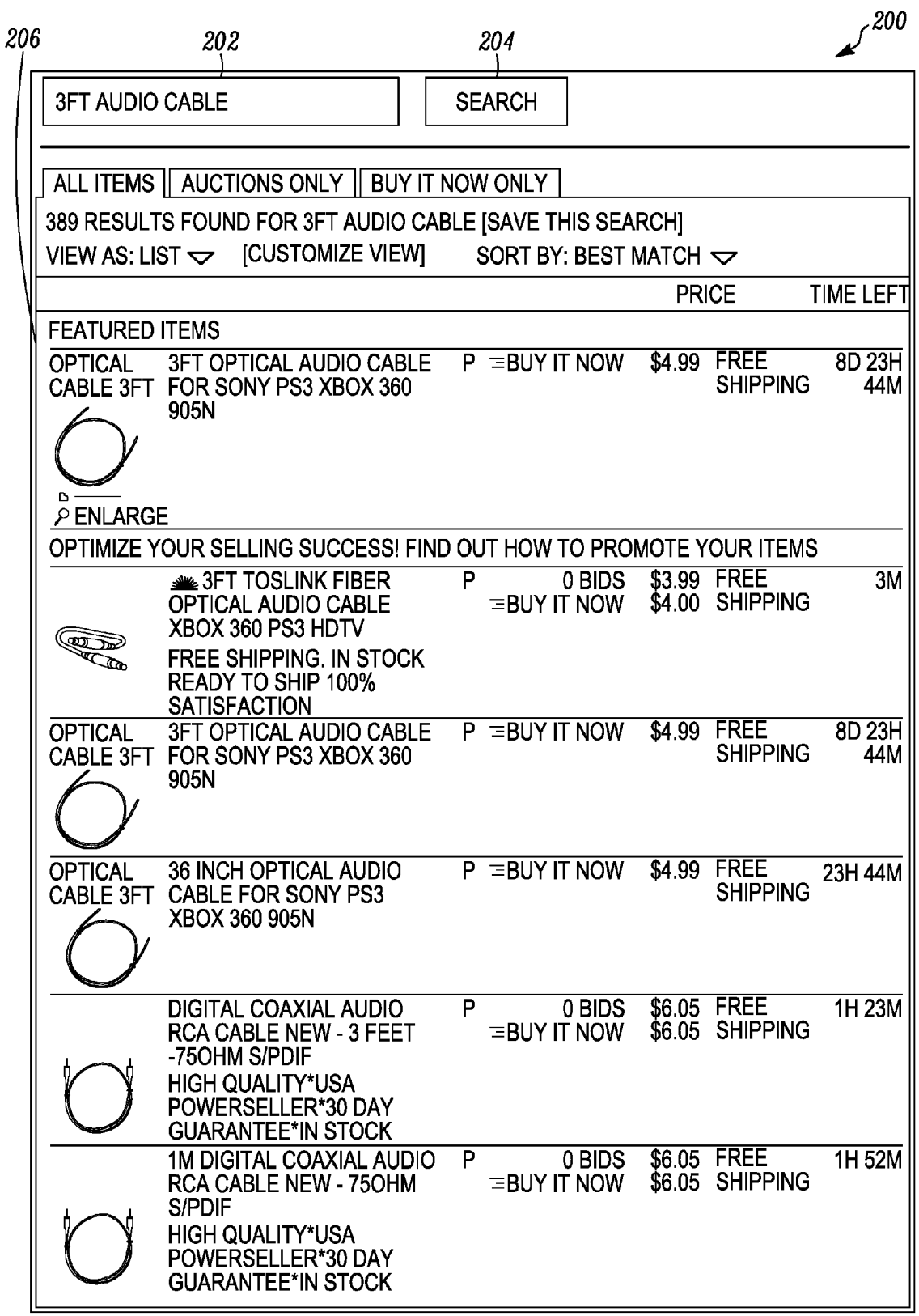
FIG. 2 illustrates a representation of a user interface presenting a search result in response to an expanded search query in accordance with various embodiments.

FIG. 2 illustrates an exemplary representation of a user interface 200 presenting a search result in response to an expanded search query in accordance with various embodiments. It is to be understood that the embodiments are not limited to this exemplary representation. Furthermore, it is to be understood that while the user interface 200 may be described as comprising a certain set of features and functions, the user interface 200 may comprise various combinations of features and functions in accordance with the described embodiments.

With reference to FIG. 1, the user interface 200 may be displayed by one or more of the client devices 104 (e.g., PC or mobile device) and may be presented via a web browser and/or a client-side web application. It can be appreciated that the embodiments are not limited to this context or to this representation.

The user interface 200 comprises a search engine interface implemented as a text entry box 202 and a search button 204 to commence a search based on a search query input into the text entry box 202. As shown, the text entry box 202 includes a search query from a user comprising an initial unit of measurement (e.g., ft) and an initial numeric value (e.g., 3). In response to activating the search button 204, the search query is automatically expanded to form an expanded search query in accordance with the described embodiments. The expanded search query is then sent to a search engine to search a database.

In this representation, a search result 206 is received in response to the expanded search query that comprises a list of items that satisfy the expanded search query. It can be appreciated that the search result 206 includes additional items beyond the constraints of the original search query that would not have been included without performing expansion of the search query. To retrieve such additional items would have required submitting a different search query which, in turn, would have provided a different search result. For example, the description of an additional item may not include the initial numeric value. The different search result would have included a different list of items that may have eliminated other items of the search result 206. In accordance with the described embodiments, however, the user is provided with a relevant search result 206 that comprises a more comprehensive list of items that may be of interest to the user in terms of price, auction timing, shipping, location, and so forth.

Operations for the above-described embodiments may be further described with reference to one or more logic flows. It may be appreciated that the representative logic flows provide an exemplary implementation of the general functionality and do not necessarily have to be executed in the order presented, or in any particular order, unless otherwise indicated. It also can be appreciated that the logic flows may be implemented by a hardware element, a software element executed by a computer, or any combination thereof.

Figure 3:
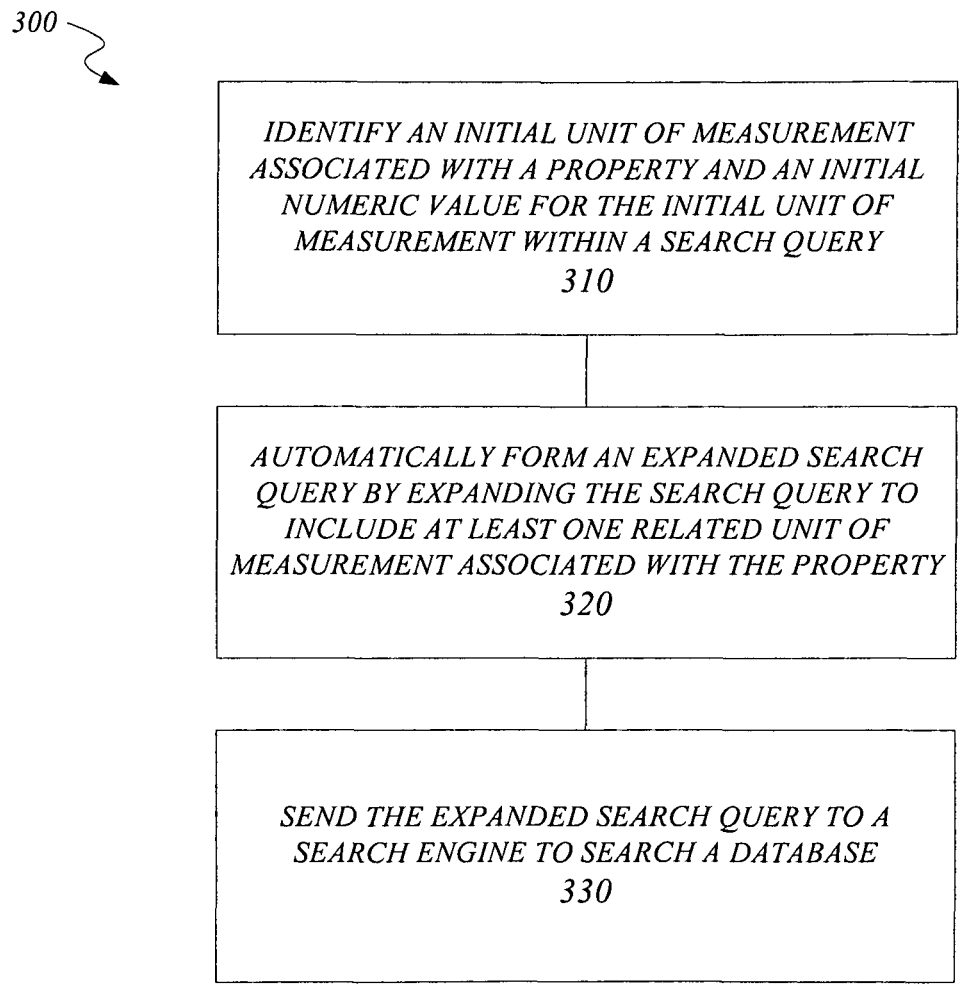
FIG. 3 illustrates a logic flow including operations for providing search query expansion in accordance with various embodiments.

FIG. 3 illustrates a logic flow 300 including logic and/or operations for providing search query expansion in accordance with various embodiments. The logic flow 300 may be performed by various systems (e.g., network-based system 110) and/or devices and may be implemented as hardware, software, firmware, and/or any combination thereof, as desired for a given set of design parameters or performance constraints. For example, the logic flow 300 may be implemented by a logic device (e.g., computing device, server, and/or processor) and/or logic (e.g., computer executable program instructions) to be executed by a logic device.

As shown, the logic flow 300 may comprise logic to identify an initial unit of measurement associated with a property and an initial numeric value for the initial unit of measurement within a search query (block 310), logic to automatically form an expanded search query by expanding the search query to include at least one related unit of measurement associated with the property (block 320), and logic to send the expanded search query to a search engine to search a database (block 330).

It can be appreciated that while the logic flow 300 may illustrate a certain combination of logic and/or sequence of steps, other combinations of logic and/or sequences of steps may also be implemented and/or performed in accordance with the described embodiments. Moreover, some individual steps of the logic flow 300 may include multiple sub-steps that may be performed in various sequences as appropriate to the individual step. Furthermore, additional steps may be added or some steps may be removed depending on the particular implementation.

In various embodiments, one or more operations of the logic flow 300 may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable programming language in accordance with the described embodiments.

In various embodiments, one or more operations of the logic flow 300 may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

Although some embodiments may be illustrated and described as comprising exemplary functional components or modules performing various operations, it can be appreciated that such components or modules may be implemented by one or more hardware components, software components, firmware components, and/or combination thereof.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A computer-implemented method comprising:
   determining whether a current search query returns a threshold number of items;
   using a previously submitted query as a search query when the current search query does not return the threshold number of items;
   identifying an initial unit of measurement associated with a property and an initial numeric value for the initial unit of measurement within the search query;
   determining one or more units of measurement related to the initial unit of measurement;
   performing a mathematical conversion on the initial numeric value, wherein the one or more units of measurement related to the initial unit and the mathematical conversion are updated based on a popularity and/or a success of user-submitted search queries;
   automatically forming an expanded search query by expanding the search query to include at least one related unit of measurement associated with the property;
   identifying at least one other search term within the search query other than the initial unit of measurement and the initial numeric value;
   determining an alias of the at least one other search term, wherein the alias comprises a translation of the at least one other search term in another language and is included in the expanded search query, wherein the language comprises a natural language; and
   sending the expanded search query to a search engine to search a database, wherein the formation of the expanded search query is performed after the search query is received and prior to submitting the search query to the search engine, or separate from and off-line relative to search query operations.

2. The method of claim 1, wherein the at least one related unit of measurement comprises an alias of the initial unit of measurement.

3. The method of claim 2, wherein the alias comprises at least one of a contracted form of the initial unit of measurement, a fall name of the initial unit of measurement, a language translation of the initial unit of measurement, and an alternate spelling of the initial unit of measurement.

4. The method of claim 2, further comprising associating the alias and the initial numeric value for inclusion within the expanded search query.

5. The method of claim 1, wherein the at least one related unit of measurement comprises a different unit of measurement associated with the property of the initial unit of measurement.

6. The method of claim 5, wherein the different unit of measurement is determined in response to receiving at least one of the initial unit of measurement, an alias of the initial unit of measurement, and an identifier associated with the initial unit of measurement.

7. The method of claim 5, wherein the initial unit of measurement and the at least one related unit of measurement are defined by a common unit of measurement system.

8. The method of claim 5, wherein the initial unit of measurement and the at least one related unit of measurement are defined by different unit of measurement systems.

9. The method of claim 5, further comprising:
mathematically converting the initial numeric value for the initial unit of measurement into a converted numeric value for the at least one related unit of measurement; and
expanding the search query according to the converted numeric value.

10. The method of claim 9, further comprising:
calculating an exact value for unit conversion; and
mathematically rounding the exact value.

11. The method of claim 9, further comprising:
calculating a numeric value range comprising the converted numeric value; and
expanding the search query according to the numeric value range.

12. The method of claim 9, further comprising:
determining an alias of the at least one related unit of measurement; and
associating the alias and the converted numeric value for inclusion within the expanded search query.

13. The method of claim 1, further comprising receiving search results from the search engine to display on a user interface presented by a computer.

14. A system comprising:
a processor configured to determine whether a current search query returns a threshold number of items;
use a previously submitted query as a search query when the current search query does not return the threshold number of items;
identify an initial unit of measurement associated with a property and an initial numeric value for the initial unit of measurement within the search query;
determine one or more units of measurement related to the initial unit of measurement;
perform a mathematical conversion on the initial numeric value, wherein the one or more units of measurement related to the initial unit and the mathematical conversion are updated based on a popularity and/or a success of user-submitted search queries;
automatically form an expanded search query by expanding the search query to include at least one related unit of measurement associated with the property;
identify at least one other search term within the search query other than the initial unit of measurement and the initial numeric value;
determine an alias of the at least one other search term, wherein the alias comprises a translation of the at least one other search term in another language and is included in the expanded search query, wherein the language comprises a natural language; and
send the expanded search query to a search engine to search a database, wherein the formation of the expanded search query is performed after the search query is received and prior to submitting the search query to the search engine, or separate from and off-line relative to search query operations.

15. The system of claim 14, wherein the processor mathematically converts the initial numeric value for the initial unit of measurement into a converted numeric value for the at least one related unit of measurement.

16. The system of claim 14, further comprising the search engine.

17. A non-transitory computer-readable storage medium comprising executable computer program instructions that when executed enable a computing system to:
determine whether a current search query returns a threshold number of items;
use a previously submitted query as a search query when the current search query does not return the threshold number of items;
identify an initial unit of measurement associated with a property and an initial numeric value for the initial unit of measurement within the search query;
determine one or more units of measurement related to the initial unit of measurement;
perform a mathematical conversion on the initial numeric value, wherein the one or more units of measurement related to the initial unit and the mathematical conversion are updated based on a popularity and/or a success of user-submitted search queries;
automatically form an expanded search query by expanding the search query to include at least one related unit of measurement associated with the property;
identify at least one other search term within the search query other than the initial unit of measurement and the initial numeric value;
determine an alias of the at least one other search term, wherein the alias comprises a translation of the at least one other search term in another language and is included in the expanded search query, wherein the language comprises a natural language; and
send the expanded search query to a search engine to search a database, wherein the formation of the expanded search query is performed after the search query is received and prior to submitting the search query to the search engine, or separate from and off-line relative to search query operations.

18. The non-transitory computer-readable storage medium of claim 17 comprising executable computer program instructions that when executed enable the computing system to mathematically convert the initial numeric value for the initial unit of measurement into a converted numeric value for the at least one related unit of measurement.

* * * * *

UNITED STATES PATENT AND TRADEMARK OFFICE
CERTIFICATE OF CORRECTION

PATENT NO. : 8,504,582 B2  Page 1 of 1
APPLICATION NO. : 12/347651
DATED : August 6, 2013
INVENTOR(S) : Benny Soetarman It is certified that error appears in the above-identified patent and that said Letters Patent is hereby corrected as shown below:

In the Claims

Claim 3, column 22, line 67, change the word "fall" to --full--.

Signed and Sealed this
Sixteenth Day of September, 2014

Michelle K. Lee
*Deputy Director of the United States Patent and Trademark Office*